Nov. 25, 1958

W. R. CARLSEN 2,861,348

AXIAL PITCH MEASURING DEVICE

Filed Nov. 19, 1953

INVENTOR.
William R. Carlsen,
BY
Harness, Dickey & Pierce
ATTORNEYS.

Nov. 25, 1958 W. R. CARLSEN 2,861,348
AXIAL PITCH MEASURING DEVICE
Filed Nov. 19, 1953 4 Sheets-Sheet 2
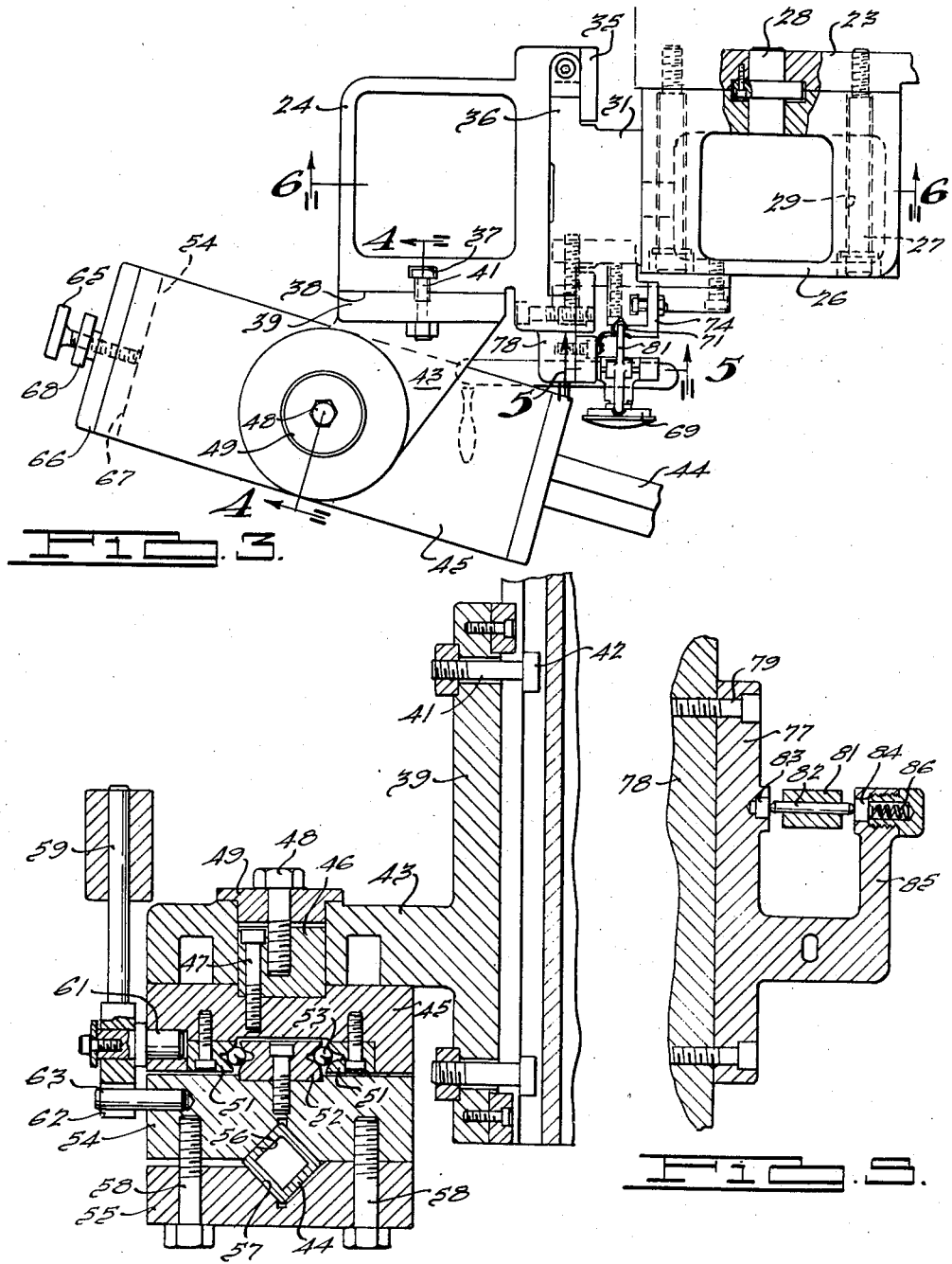
INVENTOR.
William R. Carlsen.
BY
Harness, Dickey & Pierce
ATTORNEYS.

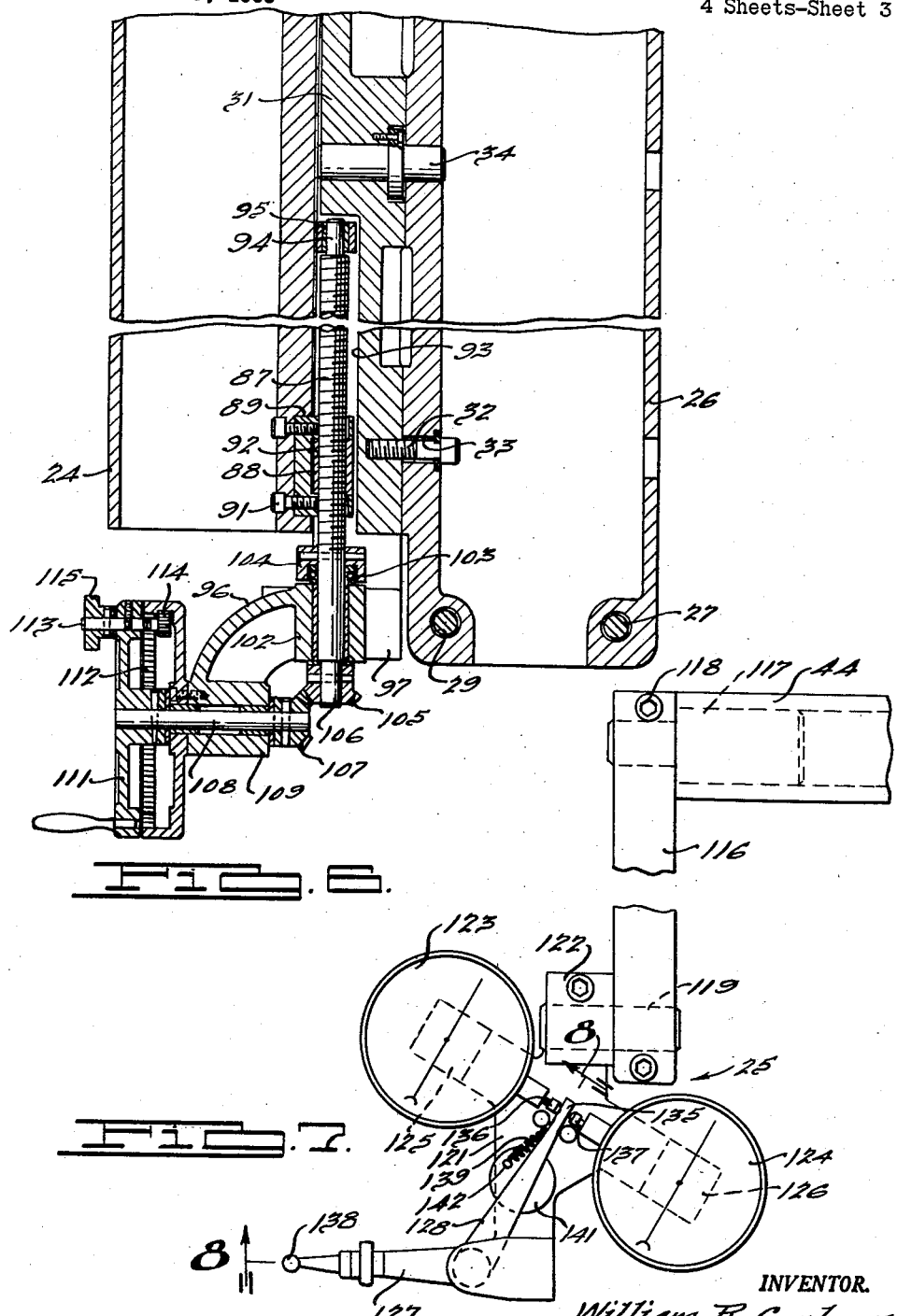

Nov. 25, 1958  W. R. CARLSEN  2,861,348
AXIAL PITCH MEASURING DEVICE
Filed Nov. 19, 1953  4 Sheets-Sheet 4
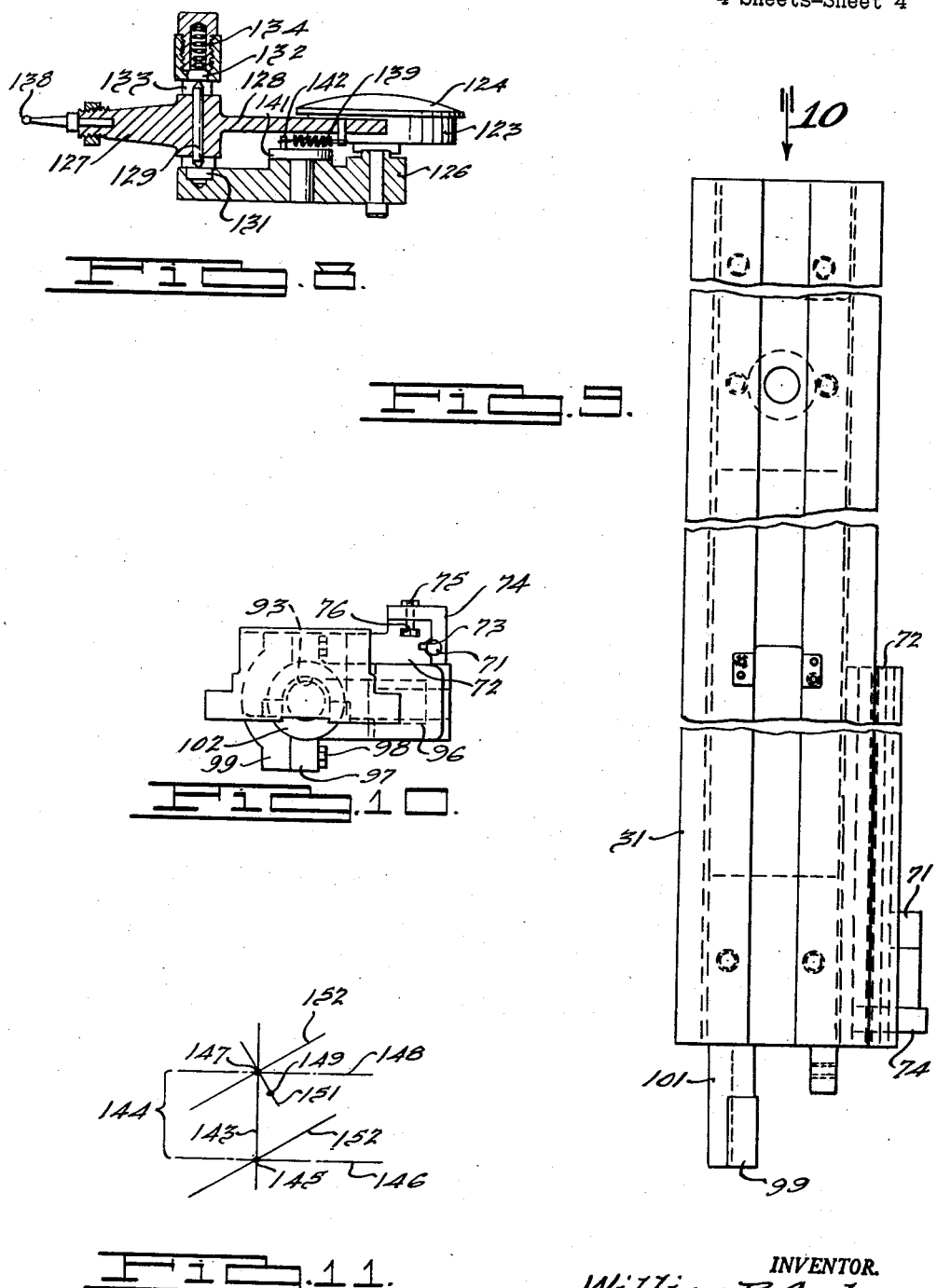
INVENTOR.
William R. Carlsen.
BY
Harness, Dickey & Pierce
ATTORNEYS United States Patent Office 2,861,348
Patented Nov. 25, 1958

2,861,348
AXIAL PITCH MEASURING DEVICE

William R. Carlsen, Huntington Woods, Mich., assignor to Michigan Tool Company, Detroit, Mich., a corporation of Delaware Application November 19, 1953, Serial No. 393,109

2 Claims. (Cl. 33—179.5)

This invention relates to gear forming, and more particularly to a device for checking the axial pitch and eccentricity of a gear mounted in a finishing machine.

In the process of finishing helical gears the necessity of an accurate checking means for the helix angle is well recognized. For example, a slight error in setting the angular inclination of the shaving cutter head can throw off a perfectly hobbed helix angle. Since the shaving cutter angle may be initially set by feel and visual inspection of the contact markings, further angle setting adjustment is necessary, based on an accurate helix angle measurement. Moreover, in the case of large gears such as turbine reduction gears, it is impractical to move such gears to a separate device for checking the helix angle. Conventional shaving machines either have no provision for checking helix angle or provide for checking only two points over a short span.

It is an object of the present invention to provide an attachment for conventional gear finishing machines which can be used as a measuring device to check axial pitch, that is the distance parallel to the axis between corresponding sides of helical teeth, can check the accuracy of spur gear teeth and which can also be used to indicate eccentricity of the journal, shaft and gear rim.

It is another object to provide a measuring device of the above nature which enables as many readings to be taken as there are axial pitches in the face width, thus giving a much more accurate picture of the gear tooth helix than two readings taken over a span of only a few inches.

It is a further object to provide a checking device having the above characteristics, which can be used at any time during a shaving operation to furnish to the shaving machine operator all the necessary information necessary for correcting the machine settings, thus giving the operator a means to control precisely the helix on a large gear and indicating the fullness of contact that can be expected between the gear and its mating pinion before the gear is removed from the shaving machine.

It is also an object to provide a checking fixture of the above nature which is versatile in operation, can be easily adjusted to check all sizes of gears accommodated by the shaving machine, and may be readily attached to the machine.

It is another object to provide an axial pitch checking device of the above type, which has a high degree of accuracy and eliminates any errors due to backlash or tolerances in the adjusting mechanism for the device.

Other objects, features, and advantages of the present invention will become apparent from the subsequent description, taken in conjunction with the accompanying drawings.

In the drawings:

Figure 3 is a plan view of the attachment showing the manner in which the carriage is mounted on its slide;

Figure 4 is a cross-sectional view taken along the line 4—4 of Figure 3 and showing the mounting of the indicator bracket on the carriage as well as the means for slidably supporting the indicator support bar;

Figure 5 is a fragmentary cross-sectional view taken along the line 5—5 of Figure 3 and showing the pivotal support for the vertical indicator actuator;

Figure 6 is an elevational view in cross section taken along the line 6—6 of Figure 3 and showing the lead screw and attendant mechanism, parts being shown out of their true plane for purposes of clarity;

Figure 7 is an elevational view of the checking indicators carried by the support bar showing the extension arm support as well as the means for shifting the direction of spring tension on the indicator actuator;

Figure 8 is a cross-sectional view taken along the line 8—8 of Figure 7 and showing the pivotal support for the checking indicator actuator;

Figure 9 is a detail view in elevation of the checking device slide showing its aperture for the pivot mounting;

Figure 10 is a plan view of the slide taken in the direction of the arrow 10 of Figure 9 and showing the lead screw bevel gear bracket attached to the slide as well as the means for supporting the vertical gauge blocks; and Figure 11 is a diagram showing the use of the checking device in indicating helix angle inaccuracies in helical gears.

Figure 1:
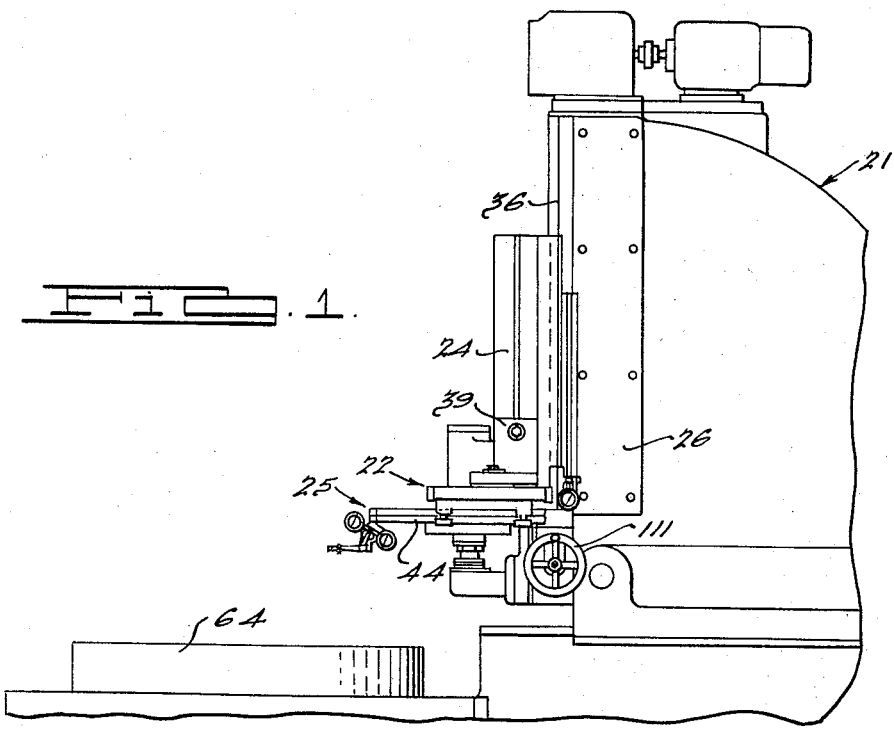
Figure 1 is a side elevational view of a portion of a vertical shaving machine carrying the checking attachment of this invention.
Figure 2:
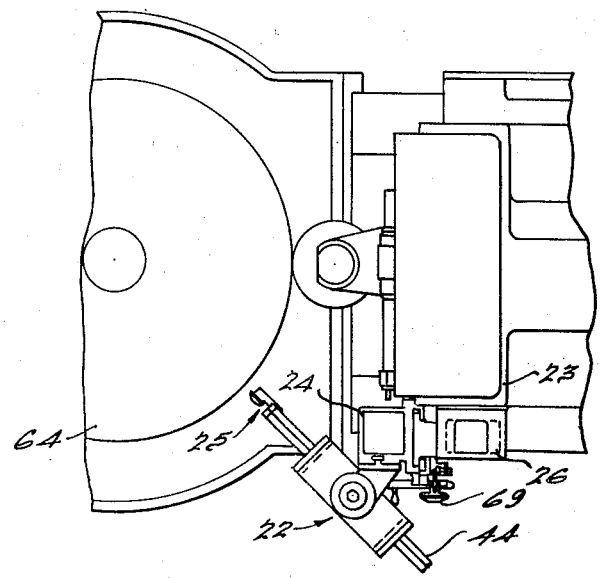
Figure 2 is a plan view showing the disposition of the checking attachment on the side of the shaving machine and its relation to the work table.

The checking device of this invention is adapted for use as an attachment for conventional types of vertical shaving machines such as that generally indicated at 21 in Figure 1 or as an attachment to similar gear finishing machines. As seen in Figures 1 and 2 the attachment, which is generally indicated at 22, may be mounted on the horizontally movable support 23 for the vertical slide of the shaving cutter. Briefly, the device comprises a vertically adjustable carriage 24 which carries indicating means generally indicated at 25 in such fashion that this indicating means may be accurately positioned both in a vertical direction and in a radial direction with respect to the gear being checked. Carriage 24 is mounted on support 23 by means of a column 26 secured to the support. This column, as seen in Figure 3, may be of a hollow nature and is secured to support 23 by a plurality of bolts 27 as well as by a pivot post 28. Apertures 29 in column 26 through which bolts 27 extend are of an enlarged nature so that column 26 may be accurately adjusted for vertical positioning by pivoting on post 28.

Secured to column 26 is a slide 31, seen best in Figures 3 and 6 and to which carriage 24 is slidably secured. Slide 31 is held by a plurality of bolts 32 passing through enlarged apertures 33 in column 26, and a pivot post 34 also serves to support the slide. It will therefore be seen that by virtue of pivot post 34 slide 31 may be adjusted with respect to column 26 so as to attain an accurately vertical position. Thus, by means of pivot posts 28 and 34 carriage 24 may be accurately adjusted to a true plumb position.

Carriage 24 is slidably secured to slide 31 by means of plates 35 which engage the extending portions 36 of the T-shaped slide. Carriage 24 may also be of hollow configuration and has a T-shaped slot 37 on one surface thereof. This slot serves to secure to surface 38 a bracket 39 for supporting the checking indicator mechanism. In particular, a plurality of bolts 41 having heads 42 which slide in slot 37 serve to secure bracket 39 to the carriage.

Bracket 39 has an extension 43 which serves to carry a bar 44 supporting indicator mechanism 25. Means are provided for swiveling bar 44 about a vertical axis and for moving the bar in the direction of its own axis during operation of the device. In particular, a track holding member 45 is pivotally secured to the underside of bracket extension 43 by means of a pivot pin 46, this pin being secured to member 45 by bolt 47. A bolt 48 passing through a cap 49 and into pivot 46 serves to clamp member 45 to extension 43 when member 45 has been angularly adjusted. A pair of outer ball way members 51 are secured to the underside of member 45, and disposed between these ball ways is an inner ball way member 52, balls 53 being disposed between the way members. Member 52 is secured to a slide 54 which is therefore capable of sliding movement in a direction parallel to the ball ways. Slide 54, together with a clamp bar 55, serves to carry indicator support bar 44. In the illustrated embodiment, bar 44 is shown as being of rectangular shape and is disposed in V-shaped notches 56 and 57 formed in members 54 and 55 respectively. Bolts 58 serve to secure clamp bar 55 to slide 54, and by loosening these bolts bar 44 may be longitudinally adjusted independently of the sliding movement of slide 54 to accommodate various sizes of gears and shafts.

Means are provided for manually actuating slide 54 and therefore bar 44 in a longitudinal direction, that is, toward and away from the object to be measured, and this means comprises a handle 59 which is pivotally mounted on the side of member 45 by a pivot pin 61. The lower end 62 of handle 59 is slotted and a pin 63 extends from slide 54 and is disposed within this slot. It will thus be seen that rocking handle 59 will result in movement of slide 54 and bar 44 in the direction of the longitudinal axis of the bar. Stop means are provided for limiting this movement in the direction of the work table 64 of the shaving machine, and this stop means includes a stop screw 65 threadably mounted in an end plate 66 attached to one end of member 45. When moved in the direction of stop screw 65 the end surface 67 of slide 54 will abut the end of the stop screw, thus predetermining the final position of indicators 25. A lock nut 68 is provided for holding stop screw 65 in place.

As indicated above, means are provided for accurately controlling the height of carriage 24, and this means includes a height indicator 69 carried by carriage 24 which cooperates with vertical gauge blocks or rods 71 held by stationary slide 31. As seen in Figures 9 and 10, slide 31 is provided with a raised portion 72 which extends vertically along the lower portion of the slide. This raised portion has an outwardly facing V-shaped recess 73 extending therealong. A gauge rod supporting platform 74 is adjustably secured to portion 72 at the lower end of this recess by means of bolts 75 held by a T-shaped slot 76. Platform 74 thus serves as a base upon which the gauge rods 71 may be stacked, these rods being disposed partially within recess 73.

Height indicator 69 is so mounted on carriage 24 as to be adjacent gauge rods 71 so that the carriage may be accurately adjusted in a vertical direction by means of the rods. The mounting means for indicator 69 is shown in Figure 5 and comprises a bracket 77 which is secured to an extension 78 on carriage 24 by means of bolts 79. An indicator actuating lever 81 is pivotally mounted on bracket 77 for movement about a horizontal axis as seen in Figure 5. The pivotal mounting means for lever 81 may comprise a pivot pin 82 held between a bearing 83 carried by bracket 77 and a bearing 84 carried by an extension 85 of this bracket, bearing 84 being resiliently held against pin 82 by a spring 86. It will be seen from an examination of Figures 3 and 5 that one end of lever 81 is engageable with the top of stacked gauge rods 71 while the opposite end of this lever actuates indicator 69, which is of any standard movement type. It will further be observed that with lever 81 in engagement with gauge rods 71 of a predetermined height, vertical movement of carriage 24 will cause a change in reading on height indicator 69, so that the height indicator accurately indicates the vertical position of carriage 24 on slide 31.

The means for vertically adjusting carriage 24 is shown in Figure 6 and comprises a vertically disposed lead screw 87 carried by slide 31 and which is threadably engaged by a nut 88 secured to carriage 24. Nut 88 is held to the carriage by means of a carrier 89 secured to the lower end of carriage 24 by bolts 91 and which carries nut 88 in a recess 92 thereof. Lead screw 87 is disposed within a recess 93 formed in the lower end of slide 31, and the upper end 94 of the screw is rotatably supported by an upper bearing 95 held by slide 31.

The rotatable support for the lower end of lead screw 87 comprises a bracket 96 which is secured to the lower end of slide 31 and which supports the manual means for turning the lead screw. Bracket 96 is of arcuate shape as seen in Figure 6, which shows this bracket out of its true plane in order to more clearly disclose its configuration. As seen in Figures 6 and 10, the upper end of bracket 96 is provided with flanges 97 which are secured by bolts 98 to corresponding flanges 99 formed on a downward extension 101 of slide 31. A bearing 102 is formed in the upper portion of bracket 96 and serves to rotatably support the lower end of lead screw 87. A thrust bearing 103 for the lead screw is preferably disposed immediately above bearing 102, this thrust bearing coacting with a collar 104 fixed to the lead screw.

Lead screw 87 extends downwardly through bearing 102 and a bevel gear 105 is secured to the lower end 106 thereof. This bevel gear cooperates with a driving bevel gear 107 secured to a horizontal hand wheel shaft 108, this shaft being rotatably supported by a bearing support 109 formed at the lower end of bracket 96. A hand wheel 111 is secured to the outer end of shaft 108, and it will thus be seen that rotation of hand wheel 111 will cause vertical movement of carriage 24 and its associated parts. A fine adjustment means for hand wheel 111 may also be provided, and in the illustrated embodiment this adjustment comprises a stationary internal gear 112 secured to bracket 96. Hand wheel 111 carries a shaft 113 adjacent the periphery thereof, and a pinion 114 is secured to this shaft and is engageable with internal gear 112 when shaft 113 is moved axially by grasping knob 115. Rotation of knob 115 when pinion 114 is in mesh with gear 112 thus affords a slow movement of hand wheel 111 and a subsequent fine adjustment of carriage 24.

As stated previously, indicator assembly 25 is mounted at that end of support bar 44 which is closest to work table 64 of shaving machine 21. In the illustrated embodiment, an extension bar 116 is secured to the end of bar 44 by a pin 117 projecting from bar 44 and a clamping screw 118, thus permitting angular adjustment of extension bar 116. It will be understood however that if desired the indicator assembly may be secured directly to bar 44. A pin 119 is carried by the outer end of extension bar 116, and a bracket 121 is secured to this pin by an apertured lug 122 as seen in Figure 7, permitting angular adjustment of the bracket. Bracket 121 carries a pair of movement indicators 123 and 124. For this purpose the bracket has a pair of extensions 125 and 126 which have an angular alignment with respect to bar 116 and which support indicators 123 and 124 respectively. A bell crank 127 is pivotally supported by bracket 121 so as to be capable of actuating either indicator 123 or 124. The pivotal support for bell crank 127 is shown in Figure 8 and comprises a pivot pin 129 supported at one end by a bearing 131 and at the other end by a bearing 132 held by an extension 133 of bracket 121. A spring 134 urges bearing 132 into engagement with pin 129. One end 135 of bell crank 127 is disposed between sensing members 136 and 137 of indicators 123 and 124 respectively. The other end of bell crank 127 carries a feeler 138 having a spherical head which is adapted to engage the surface to be measured (not shown).

Means are provided on bracket 121 for selectively conditioning bell crank 127 to be urged in either direction. It will be appreciated that the engagement of feeler 138 with the upper face of a gear tooth requires that bell crank 127 be urged counterclockwise as seen in Figure 7, whereas engagement with the lower face of the tooth would require urging the bell crank in a clockwise direction. To achieve this result a tension spring 139 is secured between end 135 of bell crank 127 and a rotatable plate 141 carried by bracket 121. A pin 142 on plate 141 holds one end of spring 139, and it will be seen that by rotating plate 141 pin 142 may be positioned on one side or the other of the adjacent arm of bell crank 127. Feeler 138 will thus be urged in one direction or the other depending on the setting of plate 141. Moreover, the setting of spring 139 will hold end 135 of the bell crank in engagement with either sensing element 136 or 137 of dial indicators 123 and 124 respectively, so that readings may be taken no matter which side of the tooth face is engaged by feeler 138.

In operation, the checking device may be used to indicate errors in the helix angle of helical gear teeth, variations along the faces of spur gear teeth, or the eccentricity of a gear rim, shaft or journal. In use, column 26 and slide 31 are first adjusted for true plumb by movement about their respective pivots 28 and 34 and are then clamped in place. When used to indicate variations in the helix angle of helical gear teeth, bracket 39 is manually positioned on carriage 24 so as to be at approximately the right height for engaging the gear teeth, this being done by clamping bolts 41. The supporting means for indicator support bar 44 is then swung about pivot 46 so as to be radially aligned with the gear being checked, and clamping screw 48 is tightened to hold the bar supporting means in place. Bracket 121 is angularly adjusted with respect to support bar 44 so that feeler 138 swings in a path approximately at right angles to the faces of the gear teeth, and bar 44 is longitudinally adjusted by means of clamp bar 55 to bring indicator mechanism 25 approximately to the gear diameter. Handle 59 is swung so as to move bar 44 and indicator mechanism 25 to extended position adjacent the gear, and stop screw 65 is adjusted so as to bring the feeler 138 approximately to the pitch diameter of the gear teeth.

Indicator mechanism 25 is then moved to retracted position by handle 59, and a gauge rod 71 is placed on platform 74. Carriage 24 is moved vertically by lead screw 87 until lever 81 engages the gauge rod and height indicator 69 reads zero. It should be noted that this initial reading may be taken using a single gauge rod or with lever 81 engaging platform 74 directly. Indicator mechanism 25 is then advanced toward the gear by handle 59 and a reading is taken on either indicator 123 or 124, depending on which face of the gear tooth is engaged by feeler 138. This reading may be plotted on a graph as indicated in Figure 11. In this figure line 143 represents the vertical path of feeler 138 as it will be advanced between each reading, the distance 144 of each advance being calculated mathematically from the theoretical helix angle of the gear teeth. Point 145 representing the first reading will thus be placed at the intersection of line 143 with a line 146 which represents zero height.

The indicator mechanism 25 is again retracted and carriage 24 raised so that one or more gauge rods 71 may be stacked on platform 74, the height of the stack being increased by an amount equal to increment 144. Carriage 24 is again lowered until height indicator 69 reads zero. It should be observed at this point that this method entirely eliminates any errors due to backlash or tolerances in the vertical adjusting mechanism for carriage 24, so that the vertical distance moved by feeler 138 is accurately known. Indicator mechanism 25 is again advanced and a second reading is taken on the next tooth. If the reading is the same as the reading on the first tooth it is plotted at point 147 which is the intersection of line 143 with line 148 representing the height at which the reading is taken. If the second reading is different than the first reading, it is plotted at a point 149 along a line 151 which represents the path of swinging movement of feeler 138 and is at right angles to a line 152 representing the theoretical helix angle. Such a variation would thus indicate that the actual helix angle of the gear teeth varies from the theoretical helix angle as represented by line 152. Readings at successive heights will give additional points through which a curve may be drawn. After the teeth have been measured along the entire length of the gear, the gear is rotated and another set of readings is taken at another line on its periphery. It will be noted that as many sets of readings may be taken as desired around the periphery of the gear. Using the data thus obtained, the shaving machine operator can then correct the machine settings to achieve the desired helix angle.

When the device is used to indicate inaccuracies along the faces of spur gear teeth, bracket 121 is adjusted on support bar 44 so that feeler 138 swings in a path at right angles to the faces of the teeth, that is in a horizontal path. With the feeler in engagement with one face of a gear tooth, carriage 24 may be vertically adjusted in a continuous manner and readings taken on either indicator 123 or 124 at various points along the tooth. When used to measure the eccentricity of a gear rim, shaft or journal, indicator mechanism 25 is so adjusted that feeler 138 swings in a horizontal path and engages the periphery of the part to be measured. Work table 24 is slowly rotated so that departures from concentricity will be measured by indicator 123 or 124. It should be noted that since support bar 44 may be secured at various heights on carriage 24 and at various angular positions, the measuring device is extremely versatile and can be used for large varieties of gear and shaft sizes. In particular, bar 44 may be swung into a radial position with respect to the work after cutter slide support 23 is moved horizontally into position for cutting the particular gear.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device for checking gears in a gear finishing machine, a column, means for securing said column to the cutter slide support of a gear finishing machine, said securing means comprising a pivot support adapted to be held by said cutter slide support, a slide pivotally supported on said column at right angles to said first pivot support, a carriage slidably mounted on said slide, the column and slide being adjustable on their respective pivotal supports to achieve a true plumb position for said slide, means for indicating the position of said carriage relative to said column, a bar extending transversely with respect to the direction of movement of said carriage, means on said carriage supporting said bar for lengthwise movement and for pivotal movement on an axis parallel to the direction of carriage movement, an indicator carried by one end of said bar, said indicator comprising a feeler pivotally mounted on said bar for engagement with an object to be measured and means operatively associated with the feeler for indicating the pivotal movement of said feeler, and a stop for limiting the movement of said one end of the bar toward an object to be measured.

2. In a device for measuring axial pitch on gears mounted in a vertical shaving machine, a vertical slide, means for securing said slide to the cutter slide support of a vertical gear shaving machine, a carriage movable on said slide, means for indicating the vertical position of said carriage on said slide, a bar extending transversely to said slide, means supporting said bar for lengthwise movement toward and away from an object to be measured, means for preventing rotation of said bar on its own axis during said lengthwise movement, a stop for limiting the movement of said bar toward said object, a feeler pivotally mounted at one end of said bar on an axis transverse to the bar, means for angularly adjusting said feeler pivot axis with respect to the direction of movement of said carriage, and means operatively associated with said feeler for indicating the extent of pivotal movement of said feeler, said last-mentioned means comprising a lever movable with said feeler, means for selectively urging said lever and said feeler in one direction or the other about said pivotal axis, and a second movement indicator engageable by said lever when moved in a direction opposite the direction of movement for engagement with said first indicator.

References Cited in the file of this patent

UNITED STATES PATENTS

| | | |
|---|---|---|
| Re. 22,953 | Praeg | Dec. 23, 1947 |
| 1,571,641 | Pratt | Feb. 2, 1926 |
| 1,667,109 | Garlent | Apr. 24, 1928 |
| 2,046,506 | Drader | July 7, 1936 |
| 2,066,699 | Skelton | Jan. 5, 1937 |
| 2,091,376 | Reich | Aug. 31, 1937 |
| 2,112,491 | Hintz | Mar. 29, 1938 |
| 2,124,006 | Parker | July 19, 1938 |
| 2,129,311 | Street | Sept. 6, 1938 |
| 2,359,018 | Balk | Sept. 26, 1944 |
| 2,458,344 | Carroll | Jan. 4, 1949 |
| 2,483,743 | Turrettini | Oct. 4, 1949 |
| 2,504,961 | Braaten | Apr. 25, 1950 |
| 2,511,418 | Schulte | June 13, 1950 |
| 2,565,853 | Jacobson | Aug. 28, 1951 |
| 2,652,665 | Jessup | Sept. 22, 1953 |

FOREIGN PATENTS

| | | |
|---|---|---|
| 379,777 | Germany | Aug. 30, 1923 |